No. 870,094. PATENTED NOV. 5, 1907.
G. HAAS.
GATE OPERATING MECHANISM.
APPLICATION FILED MAR. 12, 1906.
2 SHEETS—SHEET 2.
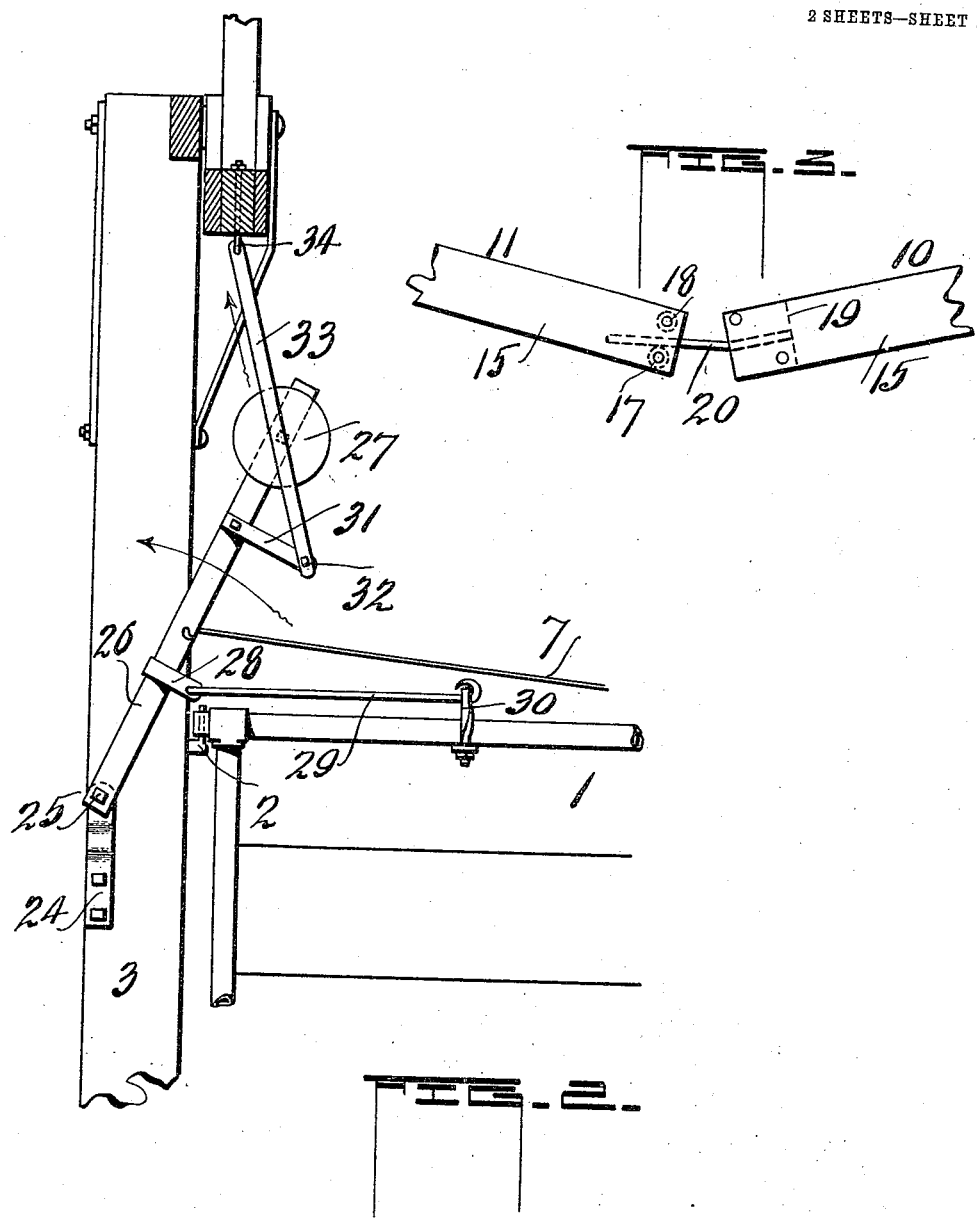
Witnesses:
Eleanor B. La Porte
J. C. Bailey
Inventors
George Haas,
Chas. N. La Porte
By
Atty.

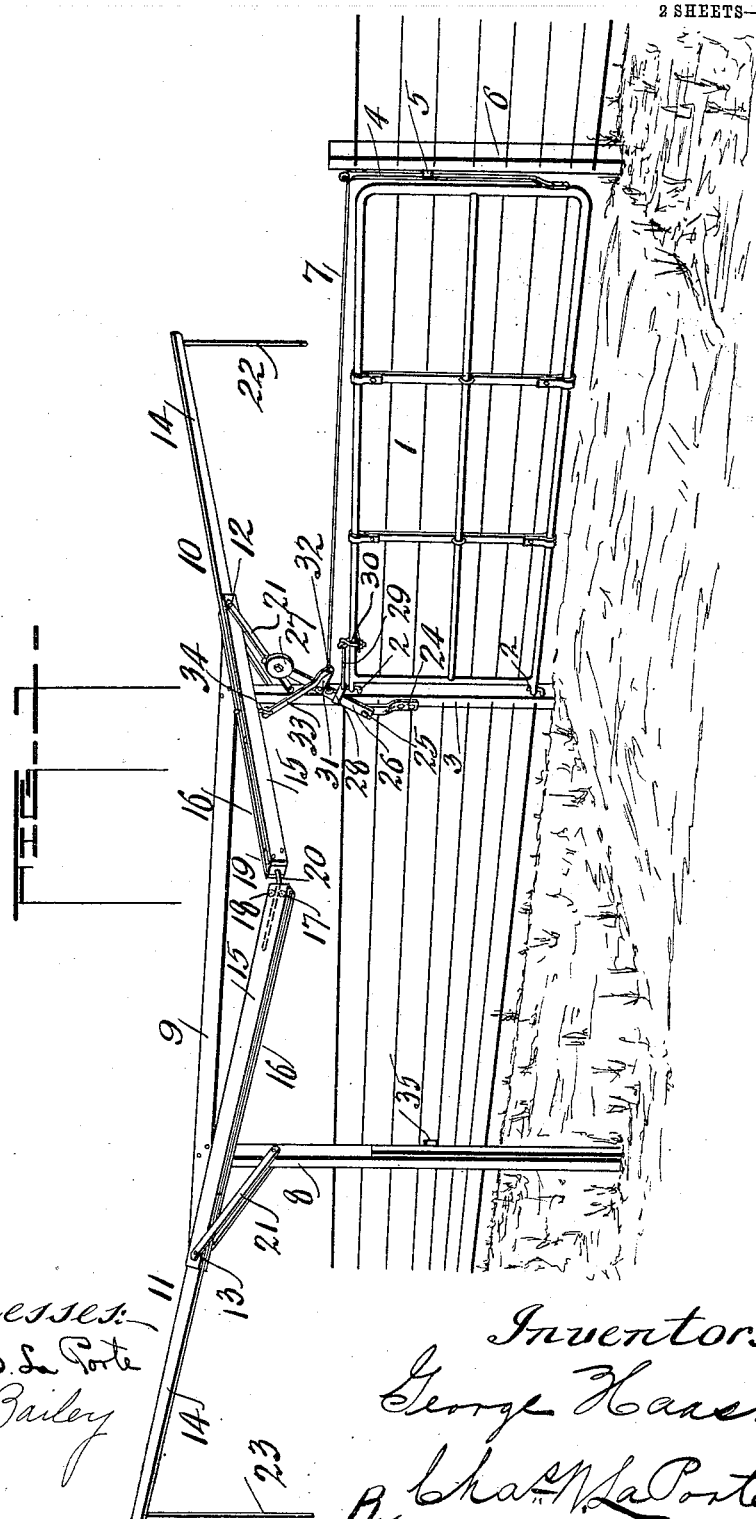

UNITED STATES PATENT OFFICE.

GEORGE HAAS, OF TREMONT, ILLINOIS.

GATE-OPERATING MECHANISM.

No. 870,094.　　　　Specification of Letters Patent.　　　　Patented Nov. 5, 1907.

Application filed March 12, 1906. Serial No. 305,577.

*To all whom it may concern:*

Be it known that I, GEORGE HAAS, a citizen of the United States, residing at Tremont, in the county of Tazewell and State of Illinois, have invented certain new and useful Improvements in Gate-Operating Mechanism; and I do hereby declare that the following is a full, clear, and exact description of the invention, which will enable others skilled in the art to which it appertains to make and use the same.
This invention has reference to certain new and useful improvements in gate operating mechanism, whereby through lever operating means gates may be automatically opened and closed, said means having connections with a suitable latch for latching and unlatching the said gates.

For a further and full description of the invention herein and the merits thereof, reference is had to the following description and the drawings hereto attached.

While the essential and characteristic features of the invention are susceptible of modification, still the preferred embodiment of the invention is illustrated in the accompanying drawings, in which:—

Figure 1 is a perspective view of a gate and the operating mechanism therefor constructed in accordance with my invention and shown closed; Fig. 2 is an enlarged detail in elevation, partly in cross section, of the gate operating mechanism, a portion of the gate and one of the operating levers, and Fig. 3 is an enlarged detail view of the inner end of a pair of operating levers.

Like numerals of reference indicate corresponding parts throughout the figures.

In the drawings 1 indicates a suitable form of farm gate hinged at points 2, to a suitable upright or post 3.
In Fig. 1 the gate is in a closed position and is adapted to be held so by means of a latch-bar 4 adapted to engage a catch or block 5 secured to an upright or post 6. The latch-bar 4 is preferably a spring-bar, which being secured at its lower end to the lower portion of the free end of the gate and extending upwardly, as shown, has connected therewith a rod 7 extending rearwardly and connected with operating means to be described.

8 denotes an upright or post similar to the post 3 and connecting the said posts at their upper ends and extending beyond each of the same is a reach or brace 9.

10 and 11 indicate a pair of operating levers, which are pivotally connected at 12 and 13 to the opposite outer ends of the reach or brace 9. Each lever consists of a bar 14 to which are secured the straps 15 and
16. At the forward end of the lever 11 and between the straps 15 and 16 are journaled a pair of spaced rollers 17 and 18. The straps 15 and 16, of the lever 10, are joined at their forward ends by a block 19 from which a bar or rod 20 projects into the forward end of the lever 11 between the straps 15 and 16 and the rollers 17 and 18, clearly seen in Figs. 1 and 3. Forming a brace for the outer ends of the reach 9 are the braces 21, and attached to and depending from the outer ends of the levers 10 and 11 are shown rods 22 and 23 by means of which an operator upon pulling down on the same may oscillate the said levers and through such movement actuate suitable devices, to be described, for opening or closing the gate 1.

To the upright or post 3 is attached a plate 24, secured to the said post at its lower end and removed a short distance therefrom at its upper end. Pivotally connected at 25 with the upper and free end of the plate 24 is a lever 26, to the upper free end of which is adjustably and detachably connected a weight 27. At a suitable point on the weighted lever is attached a strap 28 and pivotally connected with the outer end of this strap is a rod 29, which extends some distance outwardly therefrom and has its end looped through an eye 30 of a looped rod which is secured in a suitable manner to the upper longitudinal brace of the gate 1. Also attached to the said weighted lever and projecting laterally a short distance therefrom is a bar 31 to which is pivotally connected at 32 a reach 33, which at its upper end has connection with the eye or hook of the lower end of a rod 34 secured to the inner end of the bar 14 of the lever 10. It is also to the weighted lever 26 that the rod 7 is connected, best seen in Fig. 2, which at its outer end is connected with the latch-bar 4 as shown in Fig. 1.

In the operation of the gate, a person when approaching the same from either side will pull down upon one of the levers 10 or 11 which operation will elevate the inner ends of both of said levers through the connection of the rod 20 operating between the rollers 17 and 18 of the lever 11. As the lever 10 rises, that is the inner end thereof, the bar 33 is raised in the direction indicated by the arrow in Fig. 2, which through its connection as described and shown with the weighted lever 26, will cause said weighted lever to be oscillated in the direction shown by the arrow in Fig. 2; such movement reciprocating the rod 7 and releasing the latch-bar 4. The gate is swung on its hinges, through the rod 29 attached at one end to the weighted lever as shown and at its opposite end to the top brace of the said gate.
When the gate is completely open the weighted lever has swung over into a position just the opposite to that shown in Figs. 1 and 2 and the latch-bar of the gate will have engaged with a catch 35 attached in a suitable manner to the upright or post 8, see Fig. 1. The operator to again close the said gate pulls down upon the outer end of the lever 11, which, through the connections described with the gate 1 will release the latch bar 4 from the catch 35 and swing the said gate through the connection of the rod 29, between said weighted lever and said gate, into the position shown in Fig. 1.

The construction shown in the drawings for automatically opening and closing a swinging gate, is very simple, durable and conveniently operated and is such that there is little or no danger of any of the parts locking on center and thereby preventing the complete opening and closing of the said gate.

Having thus fully described my invention, what I claim and desire to secure by Letters Patent of the United States, is:—

1. The combination with an upright, of a gate hinged thereto, a weighted lever pivotally connected at one end to the upright and disposed normally in an inclined position, a strap projecting from said weighted lever, connection between said strap and the said gate, a second strap projecting from said weighted lever, an operating lever, and connection between said last mentioned strap and said operating lever.

2. The combination of an upright, of a gate hinged thereto, a spring latch-bar secured at one end to the forward end of said gate, an operating lever, a weighted lever pivotally connected at one end to said upright and disposed normally in an inclined position, connection between said latch-bar and said weighted lever, a strap projecting from the weighted lever and means connected with said strap and said operating lever, a second strap attached to said weighted lever and connection between said last mentioned strap and said gate.

3. The combination with a gate, of a pair of operating levers, each of which consist of a bar and a pair of straps connected to said bars and projecting from the same into close proximity to each other, a pair of spaced rollers journaled between the said straps at the inner end of one of said levers, a rod connected with the inner ends of the straps of the opposite lever and having movement between the rollers aforesaid of first mentioned lever, and connections between said gate and one of said levers.

In testimony whereof I affix my signature, in presence of two witnesses.

GEORGE HAAS.

Witnesses:
CHAS. W. LA PORTE,
J. M. ANERSON.